(12) United States Patent
Fukunaga

(10) Patent No.: US 11,411,465 B2
(45) Date of Patent: Aug. 9, 2022

(54) GEAR SYSTEM WITH MOTOR

(71) Applicant: Nidec Corporation, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 155 days.

(21) Appl. No.: 16/769,301

(22) PCT Filed: Dec. 4, 2018

(86) PCT No.: PCT/JP2018/044506
§ 371 (c)(1),
(2) Date: Jun. 3, 2020

(87) PCT Pub. No.: WO2019/111879
PCT Pub. Date: Jun. 13, 2019

(65) Prior Publication Data
US 2020/0395816 A1 Dec. 17, 2020

Related U.S. Application Data

(60) Provisional application No. 62/596,197, filed on Dec. 8, 2017.

(51) Int. Cl.
| | | |
|---|---|---|
| H02K 7/11 | (2006.01) | |
| H02K 7/116 | (2006.01) | |
| H02K 5/24 | (2006.01) | |
| H02K 7/00 | (2006.01) | |

(52) U.S. Cl.
CPC .............. *H02K 7/116* (2013.01); *H02K 5/24* (2013.01); *H02K 7/003* (2013.01)

(58) Field of Classification Search
CPC ........... H02K 7/116; H02K 5/24; H02K 7/003

USPC .......................................................... 310/83
See application file for complete search history.

(56) References Cited

U.S. PATENT DOCUMENTS

| 516,917 A | * | 3/1894 | Coleman | .............. H02K 16/005 |
|---|---|---|---|---|
| | | | | 310/115 |
| 6,533,082 B2 | | 3/2003 | Gill et al. | |
| 6,557,205 B2 | | 5/2003 | Ishikawa | |

FOREIGN PATENT DOCUMENTS

| EP | 2251243 | * 11/2010 | ............ H02K 7/081 |
|---|---|---|---|
| JP | 2016-032418 A | 3/2016 | |
| JP | 2017-185909 A | 10/2017 | |
| JP | 2018-034584 A | 3/2018 | |

(Continued)

OTHER PUBLICATIONS

Bollwerk et al., "Drive Unit for an Actuator, and Actuator Including a Drive Unit and a Transmission Unit", U.S. Appl. No. 16/493,014, filed Sep. 11, 2019.

(Continued)

*Primary Examiner* — Terrance L Kenerly
(74) *Attorney, Agent, or Firm* — Keating & Bennett

(57) ABSTRACT

A gear system connected to a motor, the motor including a motor shaft, a motor housing, and a motor flange, is provided. A first gear is attached to an axially lower end of the motor shaft. A second gear is attached to an axially upper end of a fixed shaft, the second gear meshing with the first gear and being rotatable with respect to the fixed shaft. A pivot shaft is directly or indirectly attached to the axially upper end of the fixed shaft, the pivot shaft being at least partially fixed in a third through-hole of a motor flange.

7 Claims, 3 Drawing Sheets

(56) References Cited

FOREIGN PATENT DOCUMENTS

KR       1020120000359     *   1/2012   ............. H02K 7/003

OTHER PUBLICATIONS

Official Communication issued in International Patent Application No. PCT/JP2018/044506, dated Feb. 19, 2019.

* cited by examiner

GEAR SYSTEM WITH MOTOR

CROSS REFERENCE TO RELATED APPLICATIONS

This is a U.S. national stage of PCT Application No. PCT/JP2018/044506, filed on Dec. 4, 2018, and priority under 35 U.S.C. § 119(a) and 35 U.S.C. § 365(b) is claimed from U.S. Provisional Patent Application No. 62/596,197, filed Dec. 8, 2017; the entire disclosures of each of which are hereby incorporated herein by reference.

1. FIELD OF THE INVENTION

The present disclosure relates to a gear system with a motor.

2. BACKGROUND

A motor gear such as a helical gear is attached to a tip of a shaft of the motor. The motor gear meshes with a system gear attached to a tip of a shaft of the gear system.

For example, a structure has been known in which a pinion 70C is attached to an output shaft 70B of a motor 70, a driving first shaft 71B is provided to a fastening member 71, and a first gear 74 that receives a driving force transmitted from the pinion 70C is rotatably mounted on the driving first shaft 71B.

However, in the shaft on the system side of the gear system, in the case where the dimension from the supported point to the portion where the system gear is attached is relatively long, when the system gear is pushed radially by the external force received from the motor gear, the shaft on the system side may bend and the shaft on the system side may vibrate in the radial direction with the rotation of the shaft on the motor side. As a result, vibration, noise, and the like may be generated, and the shaft on the system side may be damaged.

Therefore, there is a need for a structure that suppresses vibration of a shaft on the system side caused by the external force applied from a shaft on the motor side.

SUMMARY

In an example embodiment according to the present disclosure, a gear system connected to a motor is provided. The motor includes a stator and a rotor including a motor shaft extending along a central axis extending vertically. The rotor is relatively rotatable about the central axis with respect to the stator. The motor further includes a motor housing that houses the stator and the rotor inside, and a motor flange located axially below a bottom portion of the motor housing. The motor housing includes a first through-hole penetrating in an axial direction, and the motor flange includes a second through-hole and a third through-hole penetrating in the axial direction. The motor shaft protrudes axially below the motor flange through the first through-hole and the second through-hole. The gear system includes a casing and a fixed shaft. The casing includes a cover that covers an axially upper portion of the casing and includes a fourth through-hole that penetrates in the axial direction. The fixed shaft is partially fixed and passes through the fourth through-hole, an axially upper end of the fixed shaft being located axially above the cover. A first gear is attached to an axially lower end of the motor shaft. A second gear is attached to an axially upper end of the fixed shaft, the second gear meshing with the first gear and being rotatable with respect to the fixed shaft. A pivot shaft is further directly or indirectly attached to the axially upper end of the fixed shaft, the pivot shaft being at least partially fixed in the third through-hole of the motor flange.

The above and other elements, features, steps, characteristics and advantages of the present disclosure will become more apparent from the following detailed description of the example embodiments with reference to the attached drawings.

DETAILED DESCRIPTION

Figure 1:
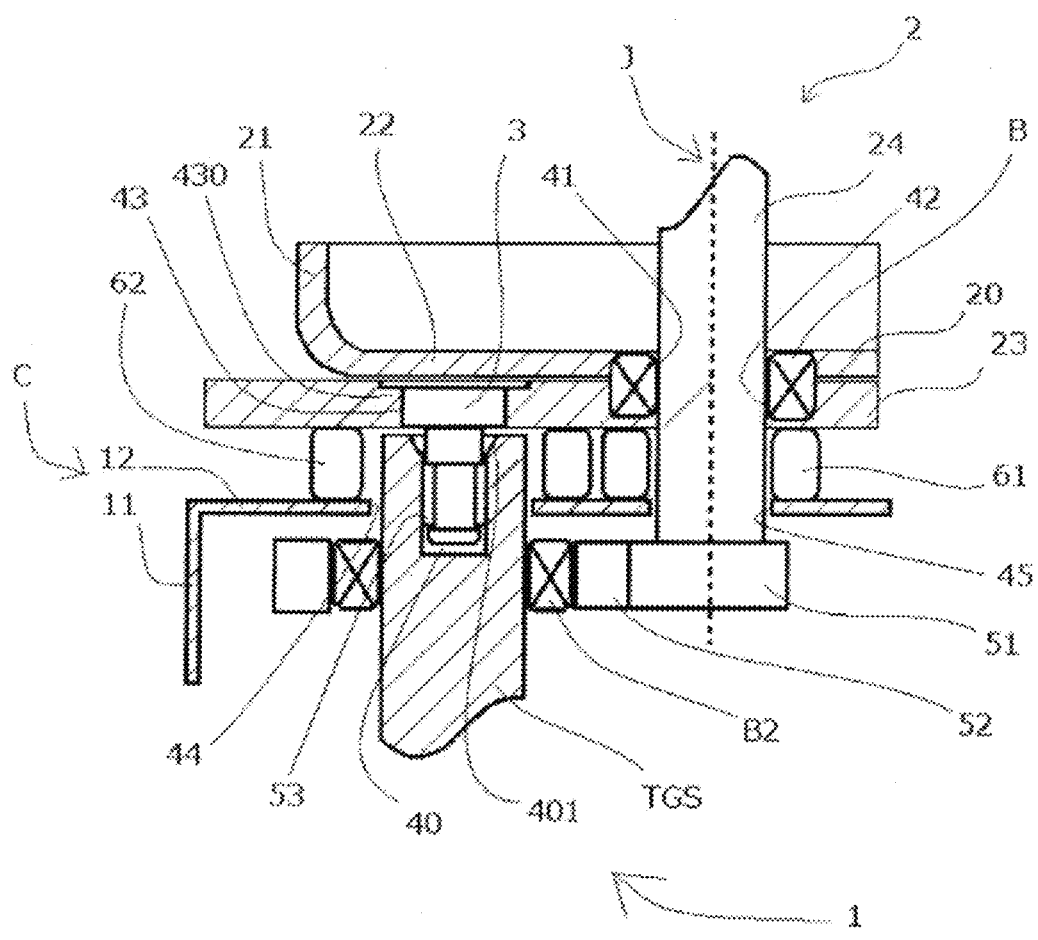
FIG. 1 is a sectional view of a motor and a gear system according to an example embodiment of the present disclosure.
Figure 2:
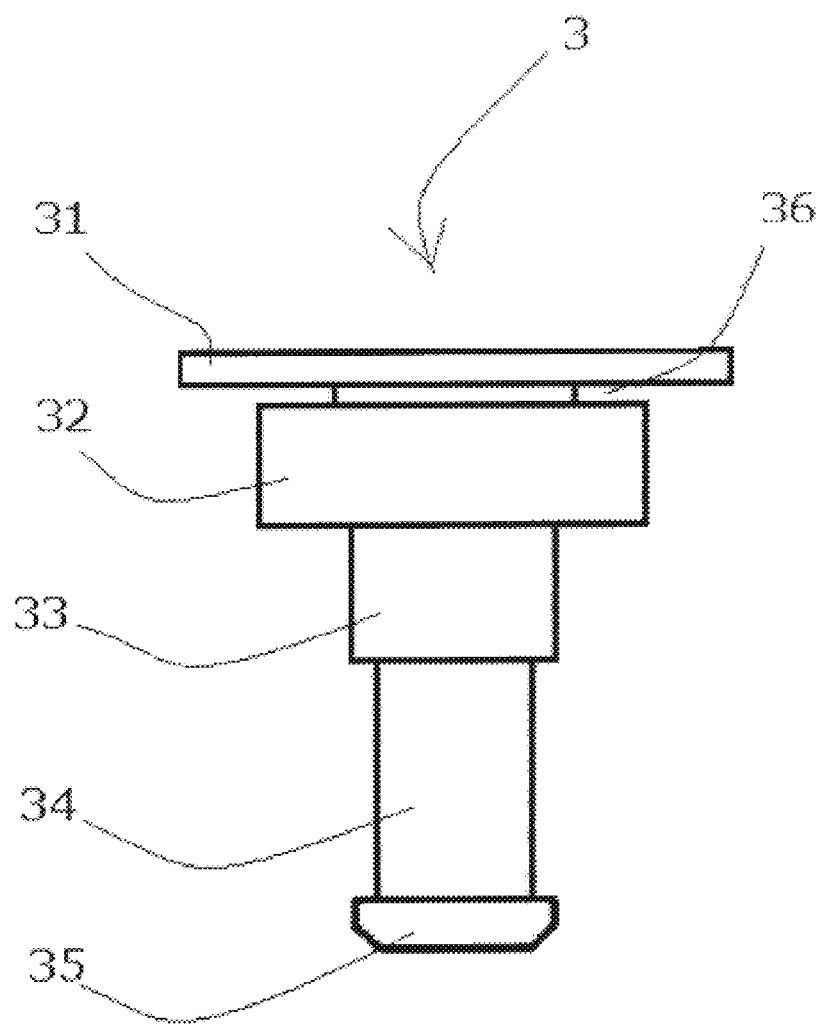
FIG. 2 is a sectional view of a pivot shaft according to an example embodiment of the present disclosure.
Figure 3:
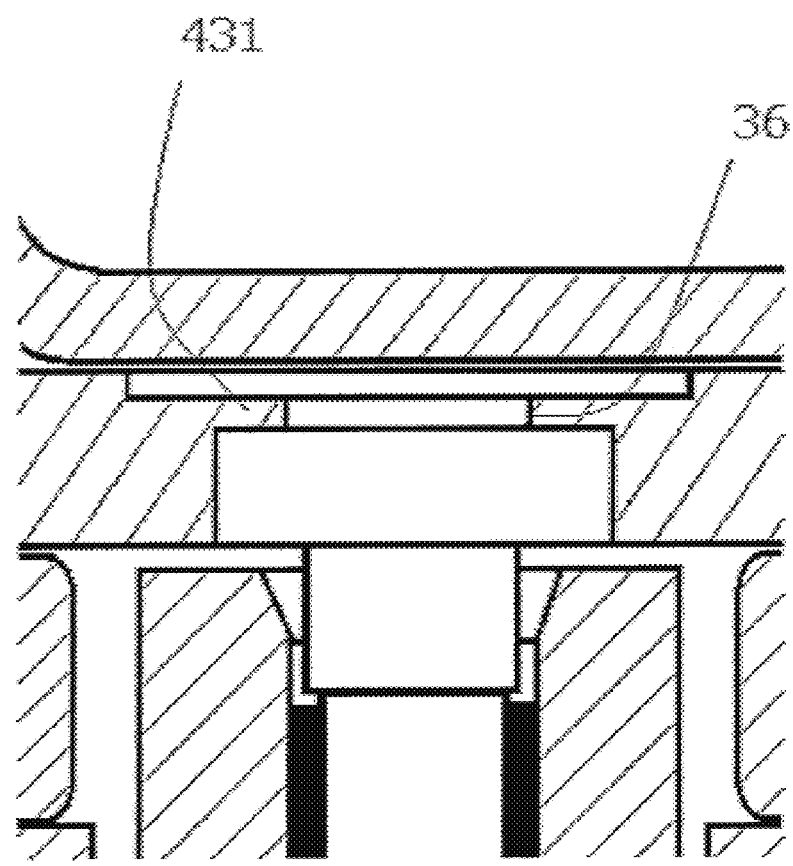
FIG. 3 is a sectional view showing a fixing structure of the pivot shaft according to an example embodiment of the present disclosure.

Hereinafter, motors and gear systems according to example embodiments of the present disclosure will be described with reference to FIGS. 1, 2, and 3.

Note that the scope of the present disclosure is not limited to the example embodiments described below, but may be arbitrarily changed within the technical spirit of the present disclosure. Further, in the following drawings, for easy understanding of each component, a scale, the number, etc., of each structure may be different from those of actual structures.

In the following description, the direction where a central axis J extends is defined as a vertical direction. The upper side in the drawings is referred to as "axially upper side" or "upper side", and the lower side in the drawings is referred to as "axially lower side" or "lower side". It should be understood that the terms of the vertical direction, the upper side, and the lower side are used for explanation only, and they do not limit the actual positional relation or direction. In addition, unless otherwise noted, a direction parallel to the central axis J is simply referred to as "axial direction", a radial direction with the central axis J as a center is simply referred to as "radial direction", and a circumferential direction with the central axis J as a center, that is, a direction around the central axis J, is simply referred to as "circumferential direction".

In the present specification, the expression of "extending in the axial direction" includes not only a case of strictly extending in the axial direction, but also a case of extending in a direction inclined in a range of less than 45° with respect to the axial direction. In addition, in the present specification, the expression of "extending in the radial direction" includes not only a case of strictly extending in the radial direction, that is, in the direction perpendicular to the axial direction, but also a case of extending in a direction inclined in a range of less than 450 with respect to the radial direction.

The motor has a rotor (not shown), a stator (not shown), a motor housing 20, and a motor flange 23. The motor housing 20 has a cylindrical shape extending in the direction of a central axis J extending vertically. The motor housing 20 has a cylindrical portion 21 and a bottom portion 22 that covers the axially lower side of the cylindrical portion 21. In the present example embodiment, the cylindrical portion 21 and the bottom portion 22 are a single member. The bottom portion 22 of the motor housing 20 has a first through-hole 41 that penetrates the bottom portion 22 of the motor housing 20 in the axial direction. The material of the motor housing 20 is, for example, aluminum (including an aluminum alloy) stainless steel, or the like. Inside the motor housing 20, a rotor and a stator are disposed. In other words, the motor housing 20 houses the rotor and the stator inside.

In the present example embodiment, the motor flange 23 is a plate-shaped member. The motor flange 23 is located axially below the bottom portion 22 of the motor housing 20. More specifically, the motor flange 23 contacts the bottom portion 22 of the motor housing 20 in the axial direction. The motor flange 23 is fixed to the bottom portion 22 by, for example, caulking, screws, welding, or the like. The motor flange 23 has a second through-hole 42 penetrating the motor flange 23 in the axial direction, and a third through-hole 43 penetrating the motor flange 23 in the axial direction. A motor shaft 24, described later, passes through the second through-hole 42. The third through-hole 43 houses at least a part of a pivot shaft described later.

When viewed from the axial direction, the position of the first through-hole 41 is the same as the position of the second through-hole 42 in the circumferential direction and the radial direction. In other words, the first through-hole 41 overlaps the second through-hole 42 in the axial direction. A lower bearing B is held in the first through-hole 41 and the second through-hole 42. In the present example embodiment, the lower bearing B is a ball bearing. The outer ring of the lower bearing B is fixed to the inner surface of the first through-hole 41 and the inner surface of the second through-hole 42 by press-fitting or the like. The type of the lower bearing B is not limited to a ball bearing, but may be another type of bearing.

The rotor is rotatable about the central axis J extending vertically. The rotor is relatively rotatable about the central axis J with respect to the stator. The rotor has a rotor core (not shown), a magnet (not shown), and the motor shaft 24. The rotor core is a cylindrical member extending in the axial direction. In the present example embodiment, the rotor core is a laminated steel plate in which a plurality of electromagnetic steel plates are laminated in the axial direction. The rotor core has a through-hole penetrating in the axial direction.

In the present example embodiment, the motor shaft 24 has a columnar shape extending in the axial direction. In other words, the motor shaft 24 extends along the central axis J. The motor shaft 24 is directly or indirectly fixed to the inner surface of the through-hole of the rotor core by press fitting or the like. The motor shaft 24 passes through the first through-hole 41 and the second through-hole 42. The axially lower end of the motor shaft 24 is located axially below the motor flange 23. In other words, the motor shaft 24 protrudes axially below the motor flange 23 through the first through-hole 41 and the second through-hole 42. The motor shaft 24 is rotatably supported by the lower bearing B. Although not shown, an axially upper portion of the motor shaft 24 is rotatably held by an upper bearing. The upper bearing may be the same type of bearing as the lower bearing B, or may be a different type of bearing. The size of the upper bearing may be the same as the size of the lower bearing B, or may be different.

A first gear 51 is attached to the axially lower end of the motor shaft 24. In the present example embodiment, the first gear 51 is a helical gear. Note that the first gear 51 may be a type of gear other than the helical gear.

Note that the motor shaft 24 may be a hollow member. Further, the first gear 51 may be attached at a position away from the axially lower end of the motor shaft 24 in the axially upward direction.

The magnets are disposed on the outer peripheral surface of the rotor core at equal intervals in the circumferential direction. The magnet is directly or indirectly fixed to the rotor core by caulking or another member such as a resin member.

Note that the rotor core may have one ring-shaped magnet instead of a plurality of magnets. Further, the rotor core may have a plurality of magnet holding holes, and a plurality of magnets may be disposed in the magnet holding holes.

The stator has a stator core (not shown), a plurality of coils (not shown), and an insulator (not shown).

The stator core is a cylindrical member extending in the axial direction. In the present example embodiment, the stator core is a laminated steel plate in which a plurality of electromagnetic steel plates are laminated in the axial direction. The stator core has an annular core back (not shown) and a plurality of teeth (not shown). The plurality of teeth extend radially inward from the inner surface of the core back. The respective teeth are disposed at equal intervals in the circumferential direction on the inner surface of the core back.

The insulator is a member made of an insulating material. The material of the insulator is, for example, an insulating resin. The insulator covers the outer surface of each tooth.

Each coil is disposed on each tooth. The coil is configured of a conducting wire wound around each tooth via an insulator.

When the electric power is supplied from an external power supply (not shown) to the coil of the stator via a circuit board (not shown) or the like, a magnetic action between the stator and the magnet of the rotor generates a torque to rotate the rotor in the circumferential direction. This allows the rotor to rotate relative to the stator in the circumferential direction.

A gear system 1 has a casing C and a fixed shaft TGS. The gear system 1 is used for, for example, an in-vehicle brake system. The casing C has a casing cylindrical portion 11 in a cylindrical shape and a cover member 12 that axially faces the motor flange 23. In the present example embodiment, the cover member 12 is a plate-shaped member. The cover member 12 axially faces the motor flange 23. In other words, the cover member 12 covers an axially upper portion of the casing C. The cover member 12 is fixed to the motor flange 23 via a first seal member 61 and a second seal member 62, which will be described later, by, for example, screws, caulking, or the like. The cover member 12 has a fourth through-hole 44 penetrating the cover member 12 in the axial direction and a fifth through-hole 45 penetrating the cover member 12 in the axial direction. The gear system 1 is connected to a motor 2 described later.

In the present example embodiment, the fixed shaft TGS is a columnar member extending in the axial direction. A part of the fixed shaft TGS is fixed in the gear system 1. The fixed shaft TGS passes through the fourth through-hole 44. The axially upper end of the fixed shaft TGS is located axially above the cover member 12. The axially upper end of the fixed shaft TGS axially contacts or faces the axially lower surface of the motor flange 23.

The fixed shaft TGS has a housing recess 40 that is recessed axially downward at the axially upper end. An inclined surface 401 is formed in an opening of the housing recess 40. The distance in the radial direction between the center of the fixed shaft TGS and the inclined surface 401 gradually increases toward the axially upper side. The inner diameter on the inclined surface 401 of the opening of the housing recess 40 is larger than the inner diameter of a portion located axially below the inclined surface 401. Note that a curved surface may be formed in the opening of the housing recess 40 instead of the inclined surface.

A second gear 52 is attached to the outer surface of the fixed shaft TGS. In other words, the second gear 52 is attached to the axially upper end of the fixed shaft TGS. In the present example embodiment, the second gear 52 has a second bearing portion B2 fixed to the fixed shaft TGS, and teeth (not shown). The teeth are rotatable relative to the fixed shaft TGS via the second bearing portion B2. In other words, the second gear 52 is attached relatively rotatably to the fixed shaft TGS via the second bearing portion B2. The axially lower end of the motor shaft 24 is located in the casing C via the fifth through-hole 45. The teeth mesh with the first gear 51 attached to the axially lower end of the motor shaft 24. Thus, when the first gear 51 rotates with the rotation of the motor shaft 24, the second gear 52 can also rotate. Although not shown, a power transmission mechanism such as another gear is further connected to the second gear 52.

A pivot shaft 3 is a substantially columnar member extending in the axial direction. As shown in FIG. 2, at least a part of the pivot shaft 3 is housed in the housing recess 40 and the third through-hole 43, respectively. In the present example embodiment, the pivot shaft 3 has a first pillar 31, a second pillar 32, a third pillar 33, a fourth pillar 34, and a fifth pillar 35. The second pillar 32 is located axially below the first pillar 31. The third pillar 33 is located axially below the second pillar 32. The fourth pillar 34 is located axially below the third pillar 33. The fifth pillar 35 is located axially below the fourth pillar 34. In other words, the first pillar 31, the second pillar 32, the third pillar 33, the fourth pillar 34, and the fifth pillar 35 are located continuously in the axial direction. In other words, on the outer surface of the pivot shaft 3, a plurality of steps are provided. In the present example embodiment, the first to fifth pillars 31 to 35 are a single member. The third to fifth pillars 33 to 35 are housed in the housing recess 40. In addition, the first to fifth pillars 31 to 35 may be formed of a plurality of members. The pivot shaft 3 may be solid or hollow.

The outer diameter of the fifth pillar 35 is larger than the outer diameter of the fourth pillar 34. The outer diameter of the fourth pillar 34 is smaller than the outer diameter of the third pillar 33. The outer diameter of the third pillar 33 is smaller than the outer diameter of the second pillar 32. The outer diameter of the second pillar 32 is smaller than the outer diameter of the first pillar 31. In other words, the outer diameter of the pivot shaft 3 gradually decreases from the axially upper side toward the axially lower side, and the outer diameter increases at the lower end of the pivot shaft 3. The outer diameter of the portion of the pivot shaft 3 that is housed in the housing recess 40 (that is, the third to fifth pillars) is smaller than the inner diameter of the housing recess 40.

The housing recess 40 houses a tolerance ring 53 in a cylindrical shape. More preferably, the tolerance ring 53 is fixed to the inner surface of the housing recess 40 by press-fitting, bonding, or the like. Then, at least a part of the pivot shaft is directly or indirectly fixed in the housing recess 40.

The fourth pillar 34 is at least partially housed in the through-hole of the tolerance ring 53. In other words, the fourth pillar 34 is housed in the housing recess 40 via the tolerance ring 53. The outer diameter of the axially lower end of the fourth pillar 34 is larger than the outer diameter of the fourth pillar 34 and is smaller than the outer diameter of the tolerance ring 53. The axially lower end of the tolerance ring 53 axially faces or contacts the axially upper surface of the fifth pillar 35. This suppresses the tolerance ring 53 from moving downward in the axial direction.

The third pillar 33 is located axially above the fourth pillar 34. The outer diameter of the third recess is smaller than the inner diameter of the inclined surface 401 of the housing recess 40. That is, the outer surface of the third pillar 33 radially faces the inclined surface 401 of the housing recess 40. Therefore, when the pivot shaft 3 is housed in the housing recess 40, the pivot shaft 3 can be smoothly housed in the housing recess 40 while suppressing the fourth pillar 34 and the third pillar 33 from contacting the inclined surface 401 of the housing recess 40, so that the inner surfaces of the pivot shaft 3 and the housing recess 40 can be suppressed from being damaged.

As described above, the outer diameter of the third pillar 33 is larger than the outer diameter of the fourth pillar 34. Therefore, the opening of the tolerance ring 53 on the axially upper side axially faces or contacts the axially lower surface of the third pillar 33. In the present example embodiment, the opening of the tolerance ring 53 on the axially upper side axially contacts the axially lower surface of the third pillar 33. Thus, it is possible to prevent the tolerance ring 53 from moving upward in the axial direction due to an external impact or the like and falling out of the housing recess 40.

The second pillar 32 is located axially above the third pillar 33. The second pillar 32 is at least partially housed in the third through-hole 43. In the present example embodiment, the second pillar 32 is fixed to the inner surface of the third through-hole 43 by press-fitting or the like. As a result, the pivot shaft 3 is positioned relative to the motor flange 23. Further, the fixed shaft TGS is fixed to the motor flange 23 via the pivot shaft 3.

The second pillar 32 is located axially above the opening of the housing recess 40. As described above, the outer diameter of the second pillar 32 is larger than the outer diameter of the third pillar 33. Therefore, the axially lower surface of the second pillar 32 axially faces or contacts the opening of the housing recess 40.

The first pillar 31 is located axially above the second pillar 32. As described above, the outer diameter of the first pillar 31 is larger than the outer diameter of the second pillar 32. In addition, the inner diameter of the opening of the third through-hole 43 on the axially upper side is larger than the inner diameter of the axially lower portion of the third through-hole 43. In other words, a stepped portion 430 is formed on the inner surface of the third through-hole 43.

The first pillar 31 is located inside the opening of the third through-hole 43. The axially lower surface of the first pillar 31 axially faces or contacts the upper surface of the stepped portion 430.

The upper surface of the first pillar 31 axially faces or contacts the bottom portion 22 of the motor housing 20. In the present example embodiment, the upper surface of the first pillar 31 is flush with the axially upper surface of the motor flange 23. In other words, the upper end of the pivot shaft 3 is flush with the axially upper surface of the motor flange 23. Therefore, the bottom portion 22 of the motor housing 20 can be disposed substantially parallel to the upper surfaces of the motor flange 23 and the first pillar 31, and it is possible to prevent the motor flange 23 from being disposed to be inclined relative to the central axis J.

On the outer surface of the pivot shaft 3, a recess 36 that is recessed toward the center of the pivot shaft 3 is formed.

More specifically, the recess 36 that is recessed toward the center of the pivot shaft 3 is formed on the outer surface of the second pillar 32. In the present example embodiment, the recess 36 is a substantially annular groove extending in the circumferential direction. The recess 36 is located at a position where the second pillar 32 is connected to the first pillar 31.

When the pivot shaft 3 passes through the third through-hole 43, the first pillar 31 and the second pillar 32 are press-fitted into the third through-hole 43. Thus, a protrusion 431 protruding toward the center of the pivot shaft 3 is formed on the inner surface of the third through-hole 43. The protrusion 431 is located in the recess 36. In other words, when the pivot shaft 3 passes through the third through-hole 43, the protrusion 431 is fixed in the recess 36 by press-fitting or the like. Thus, the pivot shaft 3 can be firmly fixed to the motor flange 23. Further, it is possible to prevent the pivot shaft 3 from moving in the axial direction and the radial direction when an external impact or the like is applied. As described above, the fixed shaft TGS can be positioned and fixed to the motor flange 23 by the pivot shaft 3 and the structure that supports the pivot shaft 3. As a result, even when a radial external force is applied to the fixed shaft TGS from the motor shaft 24, it is possible to suppress the fixed shaft TGS from bending and vibrating.

In the axial direction, the first seal member 61 and the second seal member 62 are disposed between the motor flange 23 and the cover member 12. In the present example embodiment, the first seal member 61 and the second seal member 62 are interposed between the motor flange 23 and the cover member 12.

In the present example embodiment, the first seal member 61 is, for example, an annular O-ring. The first seal member 61 is located axially below the opening of the second through-hole 42. The first seal member 61 is located axially above the opening of the fifth through-hole 45. The axially lower end of the motor shaft 24 passes through the through-hole of the first seal member 61.

In the present example embodiment, the second seal member 62 is, for example, an annular O-ring. The second seal member 62 is adjacent to the first seal member 61 on the radially outer side. The second seal member 62 surrounds the opening of the third through-hole 43 and the opening of the fourth through-hole 44. The inner diameter of the second seal member 62 is larger than the inner diameter of the third through-hole 43 and the inner diameter of the fourth through-hole 44. The axially upper end of the fixed shaft TGS passes through the through-hole of the second seal member 62.

With the above-described configuration, it is possible to prevent dust, water, and the like from entering the inside of the casing C and the motor housing 20 from the outside.

As described above, one example embodiment of the present disclosure has been described, but the present disclosure is not limited to the above-described example embodiment, and various modifications are possible.

For example, the above-described motor is a so-called inner rotor type motor, but may be an outer rotor type motor.

As long as the pivot shaft 3 can be fixed in the third through-hole 43, the pivot shaft 3 may have a columnar shape without a step, and the shape is not particularly limited. Further, it may be indirectly fixed to the pivot shaft 3 via a metal member or the like. That is, the pivot shaft 3 may be directly or indirectly fixed in the third through-hole 43.

At least a part of the pivot shaft 3 may be directly fixed to the housing recess 40 by press-fitting or bonding without passing through the tolerance ring 53. That is, at least a part of the pivot shaft 3 may be directly or indirectly fixed in the housing recess 40. In other words, the pivot shaft 3 may be directly or indirectly attached to the axially upper end of the fixed shaft TGS.

The example embodiment of the present disclosure can be widely used for various devices including various motors, such as a vacuum cleaner, a dryer, a ceiling fan, a washing machine, a refrigerator and an electric power steering device, an electric brake, and an electric pump.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A gear system connected to a motor,
the motor including:
a stator;
a rotor including a motor shaft extending along a central axis extending vertically, the rotor being relatively rotatable about the central axis with respect to the stator;
a motor housing that houses the stator and the rotor inside; and
a motor flange located axially below a bottom portion of the motor housing;
the motor housing including a first through-hole penetrating in an axial direction;
the motor flange including a second through-hole and a third through-hole penetrating in the axial direction;
the motor shaft protruding axially below the motor flange through the first through-hole and the second through-hole;
the gear system including a casing and a fixed shaft; wherein
the casing includes a cover that covers an axially upper portion of the casing and includes a fourth through-hole penetrating in the axial direction;
the fixed shaft is partially fixed to and passes through the fourth through-hole, an axially upper end of the fixed shaft being located axially above the cover;
a first gear is attached to an axially lower end of the motor shaft;
a second gear is attached to an axially upper end of the fixed shaft, the second gear meshing with the first gear and being rotatable with respect to the fixed shaft;
a pivot shaft is directly or indirectly attached to the axially upper end of the fixed shaft, the pivot shaft being at least partially fixed in the third through-hole of the motor flange;
the axially upper end of the fixed shaft includes a housing recess that is recessed toward an axially lower side of the fixed shaft;
at least a portion of the pivot shaft is directly or indirectly fixed in the housing recess; and
an opening of the housing recess includes an inclined surface or a curved surface in which a distance between a center of the fixed shaft and the inclined surface or between the center of the fixed shaft and the curved surface gradually increases toward an axially upper side of the fixed shaft.

2. The gear system according to claim 1, wherein an outer peripheral surface of the pivot shaft includes a recess that is recessed toward a center of the pivot shaft;

an inner surface of the third through-hole includes a protrusion that protrudes toward the center of the pivot shaft; and the protrusion is to be fixed in the recess.

3. The gear system according to claim 1, wherein a lower bearing that rotatably supports the motor shaft is held in the first through-hole and the second through-hole.

4. The gear system according to claim 1, wherein an upper end of the pivot shaft is flush with an axially upper surface of the motor flange.

5. An in-vehicle brake system comprising the gear system according to claim 1.

6. A motor connected to a gear system, the motor comprising:
- a stator;
- a rotor including a motor shaft extending along a central axis extending vertically, the rotor being relatively rotatable about the central axis with respect to the stator;
- a motor housing that houses the stator and the rotor inside; and
- a motor flange located axially below a bottom portion of the motor housing;
- the motor housing including a first through-hole penetrating in an axial direction;
- the motor flange including a second through-hole and a third through-hole penetrating in the axial direction;
- the motor shaft protruding axially below the motor flange through the first through-hole and the second through-hole;
- a first gear attached to an axially lower end of the motor shaft;
- a second gear attached to an axially upper end of a fixed shaft of the gear system, the second gear meshing with the first gear and being rotatable with respect to the fixed shaft; and
- a pivot shaft directly or indirectly attached to the axially upper end of the fixed shaft, the pivot shaft being at least partially fixed in the third through-hole of the motor flange; wherein an outer peripheral surface of the pivot shaft includes a recess that is recessed toward a center of the pivot shaft;

an inner surface of the third through-hole includes a protrusion that protrudes toward the center of the pivot shaft; and the protrusion is to be fixed in the recess.

7. A motor connected to a gear system, the motor comprising:
- a stator;
- a rotor including a motor shaft extending along a central axis extending vertically, the rotor being relatively rotatable about the central axis with respect to the stator;
- a motor housing that houses the stator and the rotor inside; and
- a motor flange located axially below a bottom portion of the motor housing;
- the motor housing including a first through-hole penetrating in an axial direction;
- the motor flange including a second through-hole and a third through-hole penetrating in the axial direction;
- the motor shaft protruding axially below the motor flange through the first through-hole and the second through-hole;
- a first gear attached to an axially lower end of the motor shaft;
- a second gear attached to an axially upper end of a fixed shaft of the gear system, the second gear meshing with the first gear and being rotatable with respect to the fixed shaft; and
- a pivot shaft directly or indirectly attached to the axially upper end of the fixed shaft, the pivot shaft being at least partially fixed in the third through-hole of the motor flange; wherein an upper end of the pivot shaft is flush with an axially upper surface of the motor flange.

\* \* \* \* \*